(12) United States Patent
Corral-Soto (10) Patent No.: US 9,019,344 B2
(45) Date of Patent: Apr. 28, 2015

(54) APPARATUS AND METHOD FOR ADJUSTING THE PERCEIVED DEPTH OF 3D VISUAL CONTENT

(75) Inventor: Eduardo R. Corral-Soto, Toronto (CA)

(73) Assignee: STMicroelectronics (Canada), Inc., Ottawa (CA)

( * ) Notice: Subject to any disclaimer, the term of this patent is extended or adjusted under 35 U.S.C. 154(b) by 407 days.

(21) Appl. No.: 13/556,969

(22) Filed: Jul. 24, 2012

(65) Prior Publication Data

US 2013/0027513 A1   Jan. 31, 2013

Related U.S. Application Data

(60) Provisional application No. 61/511,380, filed on Jul. 25, 2011.

(51) Int. Cl.
| | |
|---|---|
| H04N 15/00 | (2006.01) |
| H04N 13/00 | (2006.01) |
| H04N 13/04 | (2006.01) |
| G06T 3/00 | (2006.01) |
| G06T 5/00 | (2006.01) |

(52) U.S. Cl.
CPC ........ H04N 13/0022 (2013.01); *H04N 13/0018* (2013.01); *H04N 13/0011* (2013.01); *H04N 13/0029* (2013.01); *H04N 2013/0081* (2013.01); G06T 3/0093 (2013.01); G06T 5/005 (2013.01); *G06T 2207/10012* (2013.01)

(58) Field of Classification Search
CPC ....... H04N 15/00; H04N 13/00; H04N 13/04; H04N 13/0055; H04N 13/0018; H04N 13/0011; H04N 2013/0081
USPC .............................. 348/42–60; 345/419–427
See application file for complete search history.

(56) References Cited

U.S. PATENT DOCUMENTS

| | | | |
|---|---|---|---|
| 2012/0062548 A1* | 3/2012 | Pan et al. ....................... | 345/419 |
| 2012/0113093 A1* | 5/2012 | Liao et al. ..................... | 345/419 |

* cited by examiner

*Primary Examiner* — Michael Lee
(74) *Attorney, Agent, or Firm* — Seed IP Law Group PLLC (57) ABSTRACT

A system for adjusting the perceived depth of 3D content in response to a viewer input control signal. The system comprises: 1) a content source providing an input left stereoscopic image and an input right stereoscopic image; 2) a disparity estimator to receive the input left and right stereoscopic images, detect disparities between the input left and right stereoscopic images, and generate a disparities array; and 3) processing circuitry to fill in occlusion areas associated with the disparities array and apply a scale factor to the detected disparities to thereby generate a scaled disparities array. The system further comprises a warping engine to receive the scaled disparities array and generate an output left stereoscopic image and an output right stereoscopic image. The output left and right stereoscopic images have a different perceived depth than the input left and right stereoscopic images.

20 Claims, 5 Drawing Sheets

APPARATUS AND METHOD FOR ADJUSTING THE PERCEIVED DEPTH OF 3D VISUAL CONTENT

CROSS-REFERENCE TO RELATED APPLICATION(S) AND CLAIM OF PRIORITY

The present application is related to U.S. Provisional Patent No. 61/511,380, filed Jul. 25, 2011, entitled "VIDEO DEPTH CONTROL (VDC) USING A PERCEIVED DEPTH ADJUSTMENT ENGINE FOR 3D-TV". Provisional Patent No. 61/511,380 is assigned to the assignee of the present application and is hereby incorporated by reference into the present application as if fully set forth herein. The present application hereby claims priority under 35 U.S.C. §119(e) to U.S. Provisional Patent No. 61/511,380.

TECHNICAL FIELD OF THE INVENTION

The present application is related to systems and methods that enable the viewer of 3D content to adjust the perceived depth of the 3D content.

BACKGROUND OF THE INVENTION

Three-dimensional (3D) movies and videos are becoming increasing prevalent in the marketplace. When a stereoscopic 3D movie or video is created, two different views of a scene are either captured by physical stereoscopic cameras or artificially generated by means of computer graphics. Typically, the distance (baseline) between the cameras is kept fixed during production according to the 3D visual effects desired by the filmmaker. At the time of viewing the 3D movie or video (e.g., on a 3D television by wearing active or passive 3D glasses), a viewer will experience a "default" depth perception effect as planned by the film or video maker. However, this default perceived depth may be significantly different for different viewers. For example, it may be too strong for a child, or too weak for some adults, or it may simply produce eyestrain or headache for some viewers. Also, if a 3D television is to be viewed at a certain distance from the screen (e.g., 3 meters) and the 3DTV is located in a small room, then the experienced 3D effect by the viewer might be compromised, or eyestrain may occur, because of the inability of the viewer to move away from the 3D television set.

Therefore, there is a need in the art for an improved apparatuses and methods for adjusting the perceived depth of 3D video content.

SUMMARY OF THE INVENTION

A system is provided for adjusting the perceived depth of 3D content in response to a viewer input control signal. In an advantageous embodiment, the system comprises: 1) a content source configured to provide an input left stereoscopic image and an input right stereoscopic image; 2) a disparity estimator configured to receive the input left stereoscopic image and the input right stereoscopic image, to detect disparities between the input left stereoscopic image and the input right stereoscopic image, and to generate a disparities array; 3) processing circuitry configured to fill in occlusion areas associated with the disparities array and to apply a scale factor to the detected disparities to thereby generate a scaled disparities array, wherein the scale factor is based on the viewer input control signal; and 4) a warping engine configured to receive the scaled disparities array and to generate therefrom an output left stereoscopic image and an output right stereoscopic image, wherein the output left stereoscopic image and the output right stereoscopic image have a different perceived depth than the input left stereoscopic image and the input right stereoscopic image when perceived by the viewer.

A method is provided for adjusting the perceived depth of 3D content in response to a viewer input control signal. The method comprises: 1) receiving an input left stereoscopic image and an input right stereoscopic image, detecting disparities between the input left stereoscopic image and the input right stereoscopic image, and generating a disparities array; 2) filling in occlusion areas associated with the disparities array and applying a scale factor to the detected disparities to thereby generate a scaled disparities array, wherein the scale factor is based on the viewer input control signal; and 3) generating from the scaled disparities array an output left stereoscopic image and an output right stereoscopic image, wherein the output left stereoscopic image and the output right stereoscopic image have a different perceived depth than the input left stereoscopic image and the input right stereoscopic image when perceived by the viewer.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged 3D content processing system.

The present disclosure describes systems, apparatuses and methods that address the problems mentioned above by enabling a 3D movie (or video) viewer to adjust (i.e., increase or decrease) the perceived depth to a point that makes the viewer feel more comfortable when viewing the 3D content. In particular, the present disclosure describes systems, apparatuses and methods that: i) reuse or share a low-cost disparity estimator from a motion-compensated temporal interpolation frame rate conversion engine, ii) decrease or increase the perceived depth via a scaling parameter, as well as applying a depth offset, iii) avoid the use of a dedicated occlusion handling system on the stereoscopic images, and iv) use a low-cost model-based warping (MBW) engine that produces high quality stereoscopic image synthesis. In an exemplary embodiment, a system according to the principles of the present disclosure may be fully implemented in hardware on an application-specific integrated circuit (ASIC).

Figure 1:
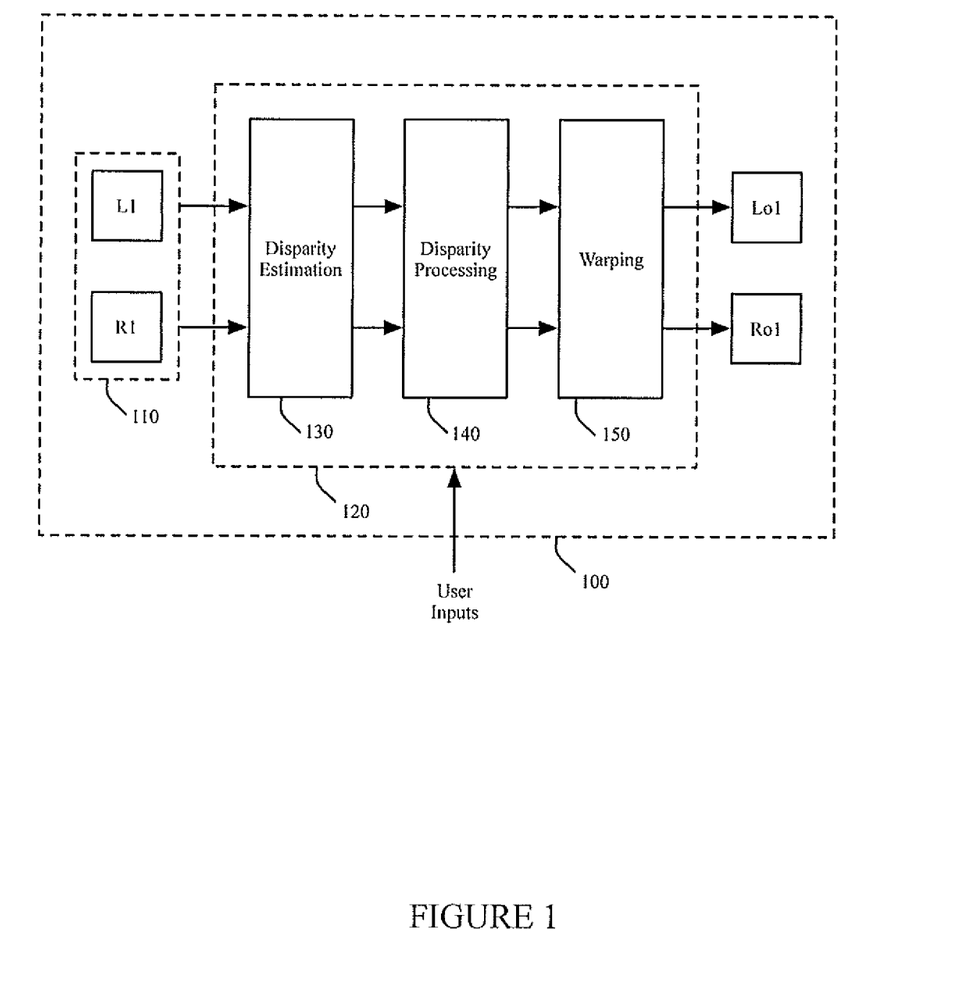
FIG. 1 illustrates a high-level diagram of a video depth control (VDC) system in accordance with the described embodiments.

FIG. 1 illustrates a high-level diagram of system 100, which comprises video depth control (VDC) system 120 in accordance with the described embodiments. System 100 may comprise any of a number of different devices that are capable of performing three-dimensional (3D) image processing. By way of example and not limitation, system 100 may comprise a 3D television set, a digital video recorder (DVR), a digital versatile disc (DVD) player, a computer system capable of executing 3D video applications, a video projector, or any similar device. System 100 comprises 3D content source 110 and VDC system 120. VDC system 120 comprises disparity estimation circuitry 130, disparity processing circuitry 140 and warping engine circuitry 150. 3D content source 110 provides 3D image data to VDC system 120. In an exemplary embodiment, the 3D image data may comprises a pair of input left and right stereoscopic images, respectively L1 and R1. VDC system 120 generates a pair of output left and right stereoscopic images, respectively Lo1 and Ro1.

The nature of 3D content source 110 will vary depending on system 100. By way of example and not of limitation, if system 100 is a DVD player, 3D content source 110 may be a digital versatile disc. If system 100 is a DVR machine, 3D content source 110 may be a large magnetic storage disc. If system 100 is a computer, 3D content source 110 may be an internal or external hard drive. If system 100 is a 3D television set, 3D content source 110 may be a cable connection that provides the input left (L1) and input right (R1) stereoscopic images.

There are two basic methods for producing a perceived depth change on stereoscopic content (i.e., L1 and R1). The first method is based on shifting the whole depth range "inwards" or "outwards" with respect to the screen surface. This method is known as Horizontal Image Translation. The second method is based on artificial changes of the baseline (separation) of the stereo cameras, where intermediate left and right images are synthesized. The present disclosure describes a system that supports both the baseline method and the Horizontal Image Translation method.

Accordingly, in FIG. 1, L1 and R1 represent a pair of input left and right stereoscopic images, respectively, and Lo1 and Ro1 represent a new pair of synthesized stereoscopic left and right images, which produce an increased or decreased perceived depth effect, with respect to the default depth effect produced by L1 and R1, when viewed by the user. Disparity estimation circuitry 130 computes stereo correspondences between L1 and R1, disparity processing circuitry 140 performs conditioning of the computed disparities, and warping engine circuitry 150 warps the input images and performs interpolation in order to synthesize the output images Lo1 and Ro1. VDC system 120 receives user input control signals that control the amount of change in the perceived depth. In an exemplary embodiment, the user input control signals may be provided by a remote control (not shown) operated by the viewer.

Disparity Estimation Circuitry 130

VDC system 120 may receive motion estimation information from an MCTI engine (not shown) that is coupled to VDC system 130 in order to compute disparities in stereoscopic images. The disparities are effectively the horizontal component of the vectors computed from a stereoscopic image pair L1 and R1. Disparity estimation circuitry 130 computes two disparity fields: L-R (from left-to-right) and R-L (from right-to-left). It is assumed that the input images L1 and R1 are already rectified by means of some epipolar rectification mechanism (in order to emulate aligned stereo cameras to simplify the matching process).

Disparity Processing Circuitry 140

After the disparities are computed, an adaptive 2D filtering mechanism is applied. In an exemplary embodiment, a bank of two-dimensional filters with different shapes may be used in order to filter the decimated disparity arrays adaptively depending upon the local structure of the disparities. A structure analysis stage may be used in order to select the proper filter according to the local characteristics of the disparities region. Such an adaptive filtering mechanism is designed to fill in the existing occlusion areas in the disparity array while minimizing distortions on the synthesized output images. After filtering, the disparity fields are up-scaled to the original image dimensions. Next, the actual values of the disparities are adjusted in two ways: 1) the disparities are multiplied by a scale factor that has a range comprising both negative and positive values (including zero), and 2) an offset (negative or positive) is added to the disparities. These two adjustments enable the user to adjust the perceived depth when viewing the final 3D outputs.

Model-Based Warping (MBW) Engine Circuitry 150

Figure 2:
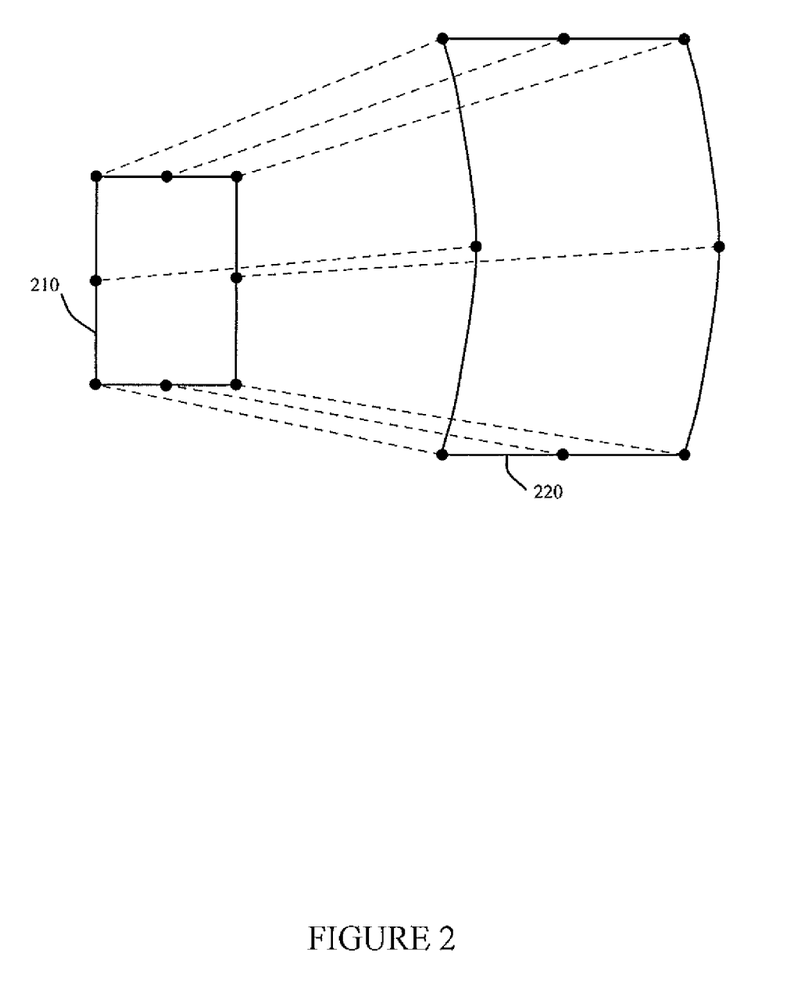
FIG. 2 illustrates an exemplary warping engine based on the use of transformation models that map a region of an input image onto an equivalent region in the warped image in accordance with the described embodiments.

After the values of the disparities have been scaled by the user control scaling factor, a new pair of stereoscopic images, Lo1 and Ro1, may be synthesized. Warping engine circuitry 150 is based on the use of transformation models that model how a first region of an input image is mapped onto an equivalent region in the warped image. FIG. 2 illustrates the operation of exemplary warping engine circuitry 150 in accordance with the described embodiments. In FIG. 2, warped image 220 has a greater vertical dimension than input image 210 and also has a greater horizontal dimension than input image 310. The differences are not intended to be to scale and may be exaggerated in order to provide clarity. Also, dotted lines connect corresponding points on the peripheries of input image 210 and warped image 220 in order to illustrate the warping effect.

Let "p" be a point in input image 210. A transformed point, "q", is obtained in warped image 220 by applying a transformation function: q=T[p]. The transformation function, T[ ], is a model with its respective parameters. Exemplary models may include, but are not limited to, the following: i) 2nd-degree polynomials (conics) in x and y; and ii) Affine models.

These models may be used for the cases where the disparities have both vertical and horizontal components (i.e., when the input images are not aligned or pre-rectified). For the specific case when the vertical component of the disparities is zero (i.e., when using aligned or pre-rectified stereo images, a simplified version of the affine transformation may be used:

$$H = \begin{bmatrix} a & b & c \\ 0 & 1 & 0 \\ 0 & 0 & 1 \end{bmatrix}$$

Figure 3:
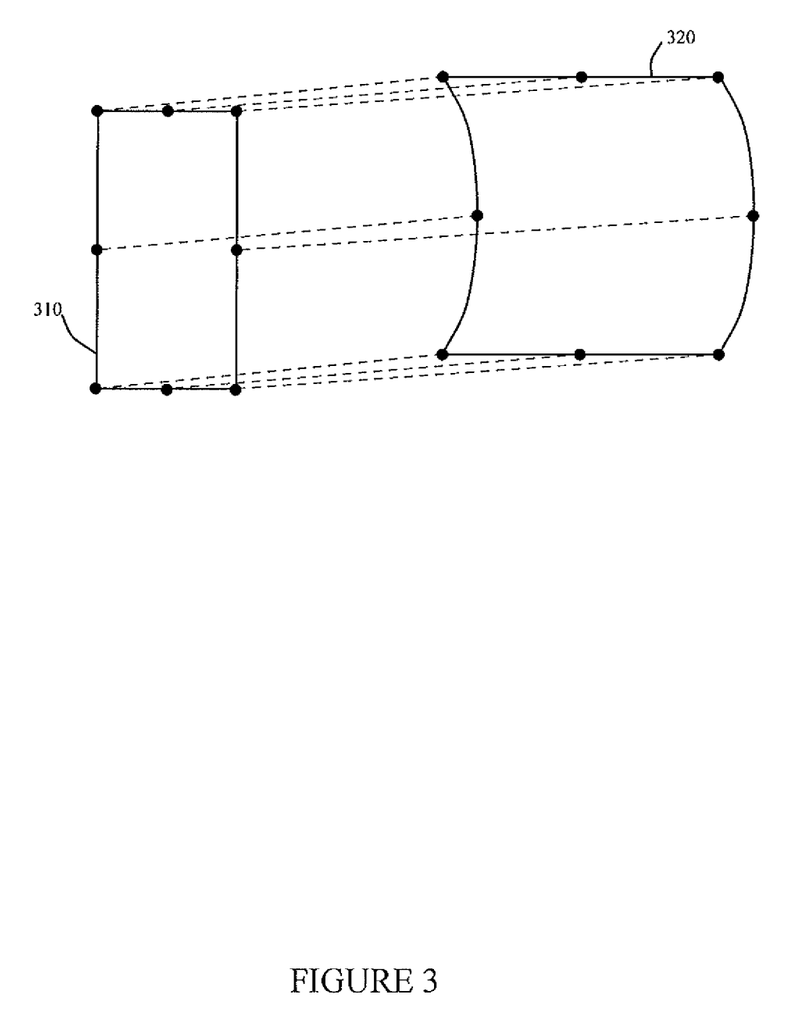
FIG. 3 illustrates a warping effect that occurs only in the horizontal direction in accordance with the described embodiments.

In this case, the warping effect occurs only in the horizontal direction. FIG. 3 illustrates a warping effect that occurs only in the horizontal direction in accordance with the described embodiments. In FIG. 3, input image 310 has the same vertical dimension as warped image 320. Warped image 320 has a greater horizontal dimension than input image 310. However, there is a slight vertical offset between input image 310 and warped image 320 in order to clearly illustrate the dotted lines connecting corresponding points on the peripheries of input image 310 and warped image 320.

Using transformation models provides a capability to determine the approximate distortion or warping of intermediate image points that lie within input images 210 and 310 and warped images 220 and 320. This goal may be achieved using a number of image correspondences (in this case in the form or stereo disparities) in order to estimate the model parameters (a, b, c, d, e, f) for the $2^{nd}$ degree and affine models and (a, b, c) for the simplified horizontal affine model. Standard statistical methods may be used to solve for these model parameters, such as Least-Squares/Maximum Likelihood Estimation.

Figure 4:
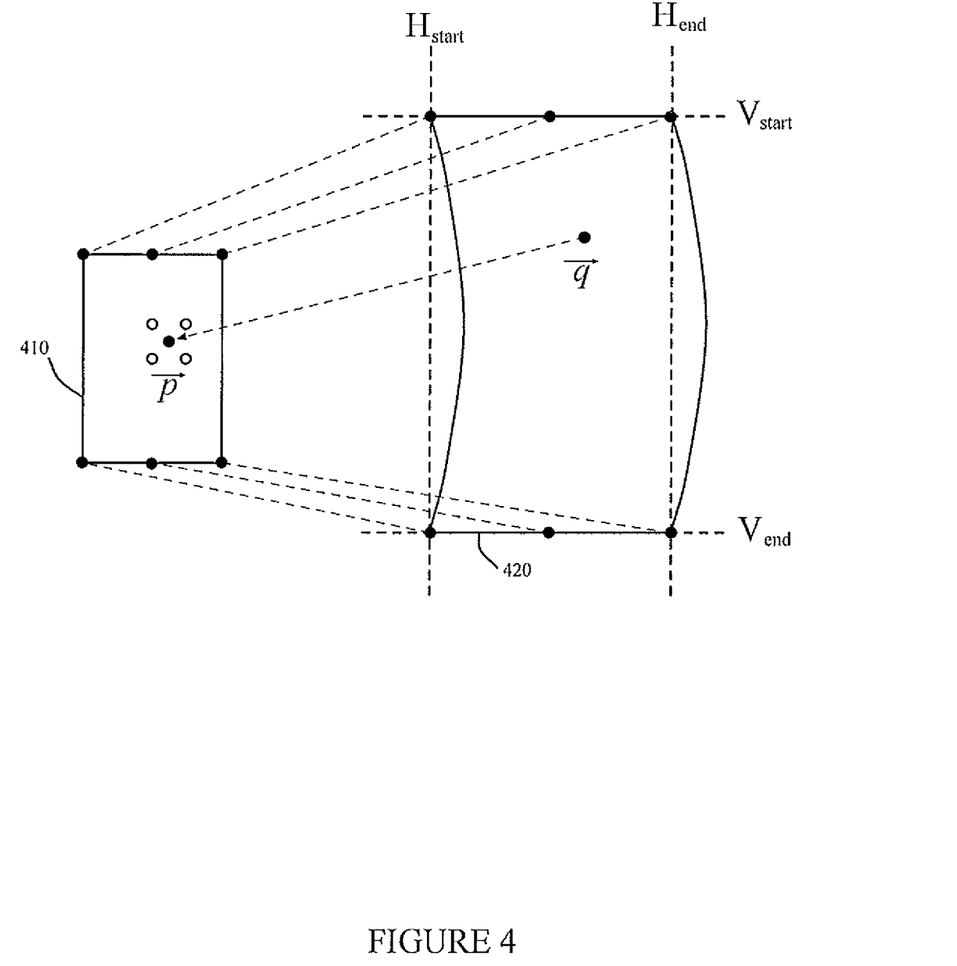
FIG. 4 illustrates an exemplary model for mapping points in a new warped region onto valid points from an un-warped image patch in accordance with the described embodiments.

Once the model parameters are computed, any point q from the warped image may be mapped onto a point p that lies within the original input (i.e., un-warped) image. FIG. 4 illustrates an exemplary model for mapping points in a new warped image 420 onto valid points from an un-warped input image 410 in accordance with the described embodiments. It is noted that the components of q are integer, whereas the components of p are real (i.e., p may have a fractional component).

Once the mapping between a point q and a point p has been performed, it is necessary to fill-in the location q of warped image 420 with meaningful color and intensity values. In an exemplary embodiment, this filling process may be performed by means of a 2D interpolation scheme, such as bilinear or bi-cubic interpolation. It was noted above that p has fractional components. Therefore, its four nearest integer neighbors in un-warped image 410 are used to produce an interpolated value that is to be inserted into the integer location q in warped image 410. The four neighbor points are represented as white circles in FIGURE. This filling procedure is repeated for all pixels that fall within warped image 420.

In order to simplify the system, the filling can be performed in the rectangle defined by the four dotted lines shown in FIG. 4: Vstart, Vend, Hstart and Hend. Multiple filling is dealt with by performing one of the following actions: 1) no action or 2) take the average of filled values. Model-based warping (MBW) engine circuitry 150 presented herein was compared against the "griddata" and "interp2" Matlab native functions.

It was found that the MBW produces very similar results to the "griddata" function, but runs significantly faster. MBW outperformed the "interp2" function, Another advantage of model-based warping is its scalability. For example, the model may be simplified in the case where only one parameter (e.g., translation) is used.

The apparatuses and methods presented in this document effectively enable the viewer to adjust the perceived depth of 3D content. The outputs of an exemplary VDC system 120 were input into a 3D television in order to experience the depth adjustment by a viewer wearing glasses and viewing the synthesized left and right image sequences. The adjustment range (slider) was limited to a range that minimizes visible artifacts and distortions. It was found experimentally that a slider range between 25% and 175% produced a reasonably good depth adjustment vs. quality trade-off.

Embodiments of the present disclosure include integrated circuits and chips, including system on a chip (SOC) and/or chip sets. By way of example, each of the devices described herein may include an integrated circuit chip or SOC for use in implementing the described embodiments and similar embodiments. Embodiments may also include computer storage products with a computer-readable medium that has non-transitory computer code thereon for performing various computer-implemented operations. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application specific integrated circuits (ASICs), programmable logic devices (PLDs) and ROM and RAM devices. Examples of computer code include machine code, such as produced by a compiler, and files containing higher-level code that are executed by a computer using an interpreter. In addition to chips, chip systems, and chip sets, the invention can be embodied as firmware written to said chips and suitable for performing the processes just described.

Figure 5:
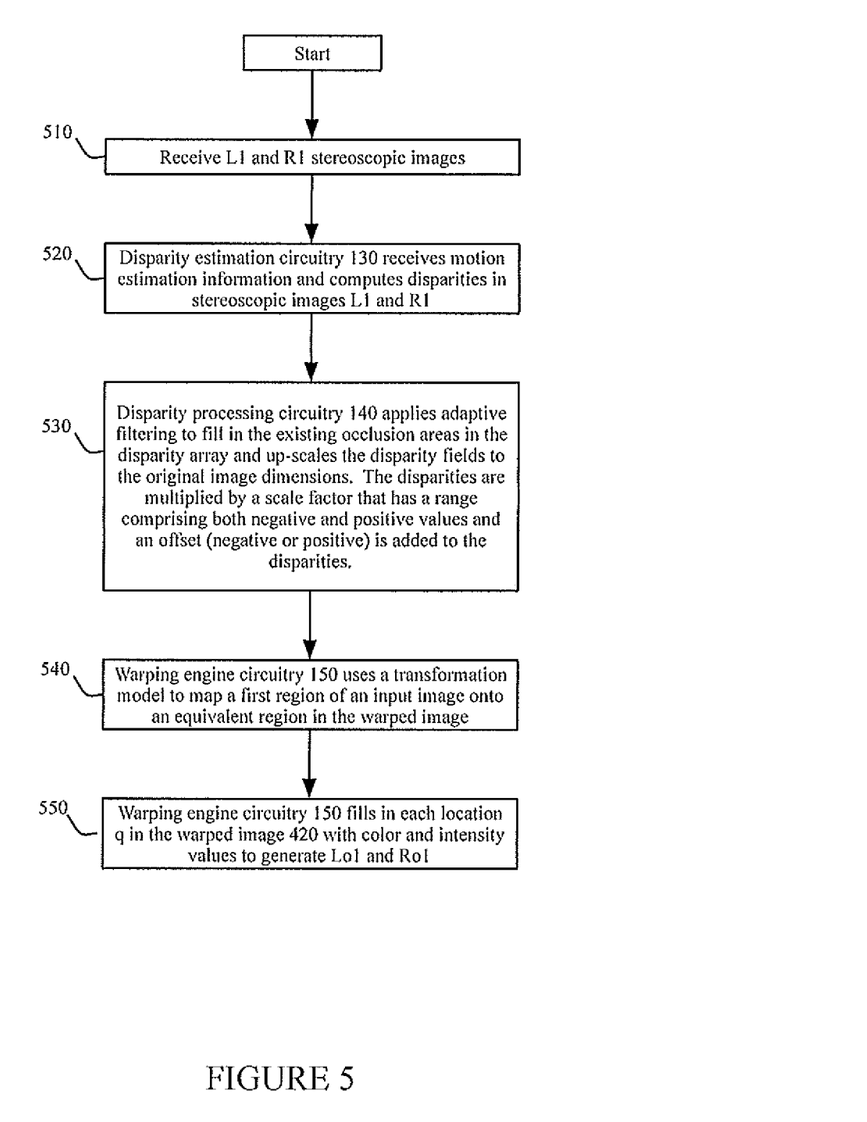
FIG. 5 is a flow diagram illustrating the operation of an exemplary warping engine in accordance with the described embodiments.

FIG. 5 is a flow diagram illustrating the operation of an exemplary warping engine in accordance with the described embodiments. Initially, VDC system 120 receives input left (L1) and input right (R1) stereoscopic images (step 510). Disparity estimation circuitry 130 receives motion estimation information and computes disparities in stereoscopic images L1 and R1 (step 520). Next, disparity processing circuitry 140 applies adaptive filtering to fill in the existing occlusion areas in the disparity array and up-scales the disparity fields to the original image dimensions. The disparities are multiplied by a scale factor that has a range comprising both negative and positive values. An offset (negative or positive) is also added to the disparities (step 530). In the next stage, warping engine circuitry 150 uses a transformation model to map each region of an input image onto an equivalent region in the warped image (step 540). Warping engine circuitry 150 fills in each location q in the warped image 420 with color and intensity values to generate Lo1 and Ro1 (step 540).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system configured to adjust the perceived depth of 3D content in response to a viewer input control signal, the system comprising:

a content source configured to provide an input left stereoscopic image and an input right stereoscopic image;

a disparity estimator configured to receive the input left stereoscopic image and the input right stereoscopic image, to detect disparities between the input left stereoscopic image and the input right stereoscopic image, and to generate a disparities array;

processing circuitry configured to fill in occlusion areas associated with the disparities array and to apply a scale factor to the detected disparities to thereby generate a scaled disparities array, wherein the scale factor is based on the viewer input control signal; and a warping engine configured to receive the scaled disparities array and to generate therefrom an output left stereoscopic image and an output right stereoscopic image, wherein the output left stereoscopic image and the output right stereoscopic image have a different perceived depth than the input left stereoscopic image and the input right stereoscopic image when perceived by the viewer, wherein the warping engine is further configured to use a transformation model to map each pixel in each of the input left stereoscopic image and the input right stereoscopic image onto a corresponding pixel in one of the output left stereoscopic image and the output right stereoscopic image.

2. The system as set forth in claim 1, wherein the scale factor has a range comprising both positive and negative values.

3. The system as set forth in claim 2, wherein the processing circuitry is further configured to apply an offset value to the detected disparities to thereby generate the scaled disparities array.

4. The system as set forth in claim 1, wherein the disparity estimator detects disparities between the input left stereoscopic image and the input right stereoscopic image using motion estimation information.

5. The system as set forth in claim 1, wherein the transformation model to map each pixel in each of the input left stereoscopic image and the input right stereoscopic image corresponds to a 2nd-degree polynomial model or an Affine model.

6. The system as set forth in claim 5, wherein the warping engine is further configured to fill in each pixel in each of the output left stereoscopic image and the output right stereoscopic image with a color value and an intensity value associated with a corresponding mapped pixel from one of the input left stereoscopic image and the input right stereoscopic image.

7. The system as set forth in claim 6, wherein the color value and intensity value associated with the corresponding mapped pixel from the one of the input left stereoscopic image and the input right stereoscopic image includes a color value and intensity value associated with at least one neighbor pixel of the corresponding mapped pixel.

8. The system as set forth in claim 2, wherein the processing circuitry comprises an adaptive filter configured to fill in the occlusion areas associated with the disparities array.

9. A device, to adjust a perceived depth of 3D content in response to a viewer input control signal, comprising:
an integrated circuit configured to:
receive an input left stereoscopic image and an input right stereoscopic image, detect disparities between the input left stereoscopic image and the input right stereoscopic image, and generate a disparities array;
fill in occlusion areas associated with the disparities array and apply a scale factor to the detected disparities to thereby generate a scaled disparities array, wherein the scale factor is based on the viewer input control signal; and
generate from the scaled disparities array an output left stereoscopic image and an output right stereoscopic image, wherein the output left stereoscopic image and the output right stereoscopic image have a different perceived depth than the input left stereoscopic image and the input right stereoscopic image when perceived by the viewer, wherein the integrated circuit is further configured to use a transformation model to map each pixel in each of the input left stereoscopic image and the input right stereoscopic image onto a corresponding pixel in one of the output left stereoscopic image and the output right stereoscopic image.

10. The integrated circuit as set forth in claim 9, wherein the scale factor has a range comprising both positive and negative values.

11. The integrated circuit as set forth in claim 10, wherein the integrated circuit is further configured to apply an offset value to the detected disparities to thereby generate the scaled disparities array.

12. The integrated circuit as set forth in claim 9, wherein the integrated circuit detects disparities between the input left stereoscopic image and the input right stereoscopic image using motion estimation information.

13. The integrated circuit as set forth in claim 9, wherein the transformation model to map each pixel in each of the input left stereoscopic image and the input right stereoscopic image corresponds to a 2nd-degree polynomial model or an Affine model.

14. The integrated circuit as set forth in claim 13, wherein the integrated circuit is further configured to fill in each pixel in each of the output left stereoscopic image and the output right stereoscopic image with a color value and an intensity value associated with a corresponding mapped pixel from one of the input left stereoscopic image and the input right stereoscopic image.

15. The integrated circuit as set forth in claim 14, wherein the color value and intensity value associated with the corresponding mapped pixel from the one of the input left stereoscopic image and the input right stereoscopic image includes a color value and intensity value associated with at least one neighbor pixel of the corresponding mapped pixel.

16. The integrated circuit as set forth in claim 10, wherein the integrated circuit comprises an adaptive filter configured to fill in the occlusion areas associated with the disparities array.

17. A method for adjusting the perceived depth of 3D content in response to a viewer input control signal, the method comprising:
receiving an input left stereoscopic image and an input right stereoscopic image, detecting disparities between the input left stereoscopic image and the input right stereoscopic image, and generating a disparities array;
filling in occlusion areas associated with the disparities array and applying a scale factor to the detected disparities to thereby generate a scaled disparities array, wherein the scale factor is based on the viewer input control signal; and
generating by applying a transformation model to the scaled disparities array an output left stereoscopic image and an output right stereoscopic image, wherein the output left stereoscopic image and the output right stereoscopic image have a different perceived depth than the input left stereoscopic image and the input right stereoscopic image when perceived by the viewer.

18. The method as set forth in claim 17, wherein the scale factor has a range comprising both positive and negative values.

19. The method as set forth in claim 18, further comprising applying an offset value to the detected disparities to thereby generate the scaled disparities array.

20. The method as set forth in claim 17, wherein detecting disparities between the input left stereoscopic image and the input right stereoscopic image comprises detecting disparities between the input left stereoscopic image and the input right stereoscopic image using motion estimation information.

\* \* \* \* \*